US011223563B2

(12) United States Patent
Zhang et al.

(10) Patent No.: US 11,223,563 B2
(45) Date of Patent: Jan. 11, 2022

(54) BASE STATION LOAD BALANCING

(71) Applicant: Hughes Network Systems, LLC, Germantown, MD (US)

(72) Inventors: Hanhui Zhang, Clarksburg, MD (US); Xiaoming Wu, Darnestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/255,437

(22) Filed: Jan. 23, 2019

(65) Prior Publication Data
US 2020/0236053 A1    Jul. 23, 2020

(51) Int. Cl.
*H04L 12/801* (2013.01)
*H04L 12/803* (2013.01)
*H04B 7/26* (2006.01)
*H04W 72/12* (2009.01)

(52) U.S. Cl.
CPC ........... *H04L 47/125* (2013.01); *H04B 7/265* (2013.01); *H04W 72/1252* (2013.01)

(58) Field of Classification Search
None
See application file for complete search history.

(56) References Cited

U.S. PATENT DOCUMENTS

| | | | | |
|---|---|---|---|---|
| 6,119,018 A | * | 9/2000 | Kondo | H04W 52/42 370/332 |
| 7,586,949 B1 | * | 9/2009 | Barany | H04B 7/2656 370/335 |
| 9,591,536 B2 | * | 3/2017 | Lei | H04W 28/08 |

FOREIGN PATENT DOCUMENTS

| | | |
|---|---|---|
| EP | 0975196 A2 | 1/2000 |
| WO | 95/01012 A1 | 1/1995 |

OTHER PUBLICATIONS

International Preliminary Report on Patentability dated Aug. 5, 2021 for Application No. PCT/US2020/012440.

* cited by examiner

*Primary Examiner* — Willie J Daniel, Jr.
(74) *Attorney, Agent, or Firm* — Bejin Bieneman PLC

(57) ABSTRACT

A base station receiver is described. The base station receiver may comprise at least one processor and memory. The memory may store instructions executable by the at least one processor. The instructions may include, to: receive, via a time-division multiple access (TDMA) scheme, a first carrier frequency comprising a first burst; receive, via the TDMA scheme, a second carrier frequency comprising a second burst; and demodulate and decode both the first and second bursts using a common demodulating and decoding node (DDN).

19 Claims, 7 Drawing Sheets

BASE STATION LOAD BALANCING

BACKGROUND

Time-division multiple access (TDMA) is a channel access method that allows multiple users to share the same frequency by dividing the channel into different time slots.

DETAILED DESCRIPTION

Figure 1:
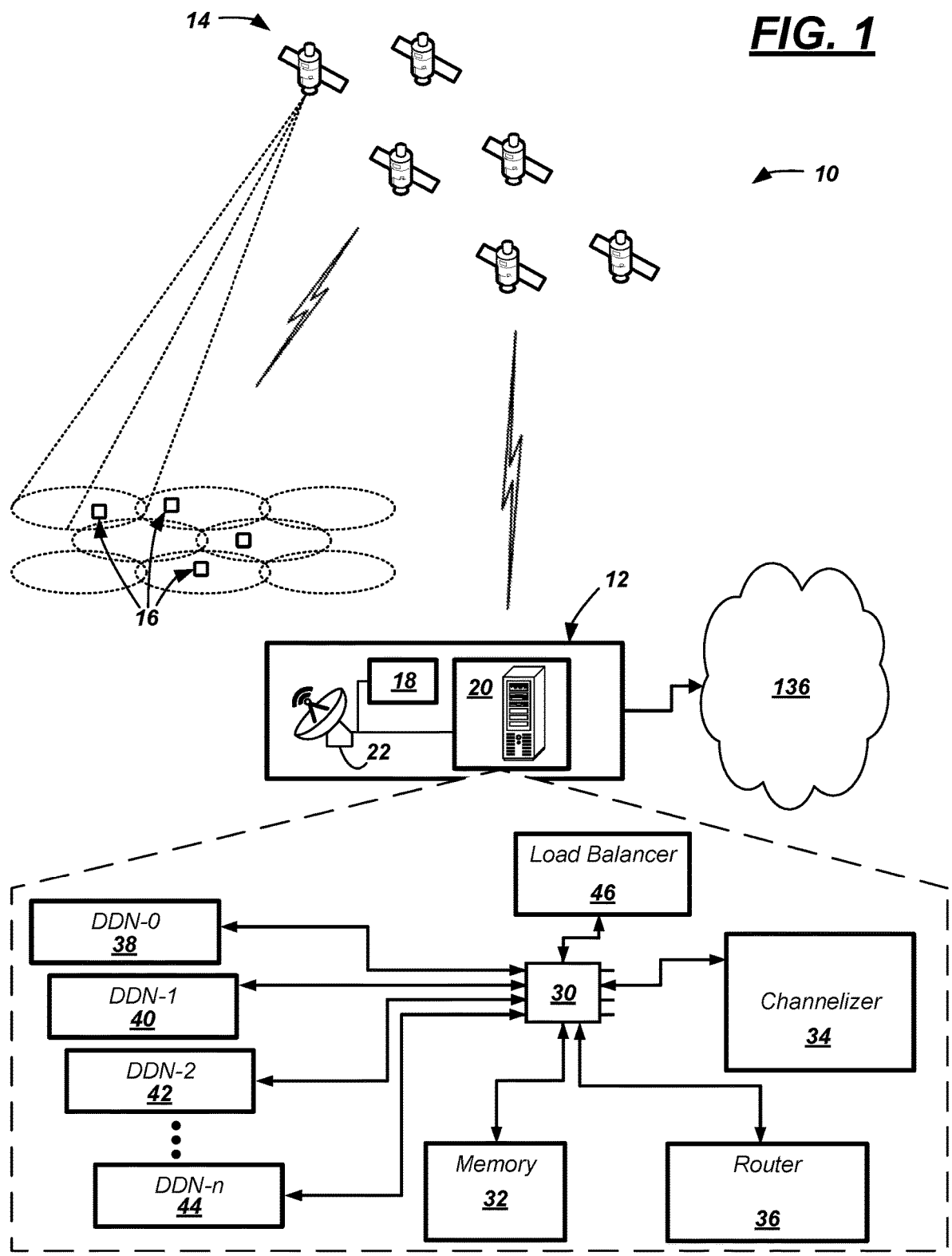
FIG. 1 illustrates an example of a satellite communication system.

According to an illustrative example, a satellite communication system is described that includes a base station receiver and a constellation of satellites. The base station receiver that includes a processor comprising instructions to: receive, via a time-division multiple access (TDMA) scheme, a first carrier frequency comprising a first burst; receive, via the TDMA scheme, a second carrier frequency comprising a second burst; and demodulate and decode both the first and second bursts using a common demodulating and decoding node (DDN).

According to the at least one example set forth above, the instructions further comprise, to: determine a first plurality of traffic packets for the first burst; route the first plurality to the common DDN; reconstruct the first burst from the first plurality; and then demodulate and decode the first burst using the common DDN.

According to the at least one example set forth above, the instructions further comprise, to: determine a second plurality of traffic packets for the second burst; route the second plurality to the common DDN; reconstruct the second burst from the second plurality; and then demodulate and decode the second burst using the common DDN.

According to the at least one example set forth above, the instructions further comprise, to: determine a first plurality of traffic packets for the first burst; and route all of the first plurality of traffic packets for the first burst to the common DDN.

According to the at least one example set forth above, the instructions further comprise, to: receive a load status report from the common DDN that indicates a capacity.

According to the at least one example set forth above, the instructions further comprise, to: update a routing schedule based on the load status report.

According to the at least one example set forth above, the routing schedule is based upon a load status report from each of a plurality of DDNs of the base station receiver.

According to another illustrative example, base station receiver, comprises: a processor comprising instructions to: receive, via a time-division multiple access (TDMA) scheme, a carrier frequency comprising a first burst and a second burst; determine from among a plurality of demodulating and decoding nodes (DDNs) which of the plurality will demodulate and decode the first burst and which of the plurality will demodulate and decode the second burst, wherein the determination includes determining a capacity of at least some of the plurality; and then, demodulate and decode both the first and second bursts.

According to the at least one example set forth above, the instructions further comprise, to: determine a first plurality of traffic packets for the first burst; route the first plurality to a first DDN of the plurality of DDNs; reconstruct the first burst from the first plurality; and then demodulate and decode the first burst using the first DDN.

According to the at least one example set forth above, the instructions further comprise, to: determine a second plurality of traffic packets for the second burst; route the second plurality to a second DDN of the plurality of DDNs; reconstruct the second burst from the second plurality; and then demodulate and decode the second burst using the second DDN.

According to the at least one example set forth above, the instructions further comprise, to: determine a first plurality of traffic packets for the first burst; and route all of the first plurality of traffic packets for the first burst to a same DDN of the plurality of DDNs.

According to the at least one example set forth above, the instructions further comprise, to: receive a load status report from each of the plurality of DDNs that indicates its respective capacity.

According to the at least one example set forth above, the instructions further comprise, to: update a routing schedule based on the load status report, wherein the routing schedule is used to determine which of the plurality of DDNs will demodulate and decode a next burst.

According to the at least one example set forth above, the routing schedule is based upon a load status report from each of a plurality of DDNs of the base station receiver.

According to another illustrative example, a method of operating a base station comprises: receiving, via a time-division multiple access (TDMA) scheme, a carrier frequency comprising a first burst and a second burst; determining from among a plurality of demodulating and decoding nodes (DDNs) which of the plurality will demodulate and decode the first burst and which of the plurality will demodulate and decode the second burst, wherein the determination includes determining a capacity of at least some of the plurality; and then, demodulating and decoding both the first and second bursts.

According to the at least one example set forth above, the method further comprises: determining a second plurality of traffic packets for the second burst; routing the second plurality to a second DDN of the plurality of DDNs; reconstructing the second burst from the second plurality; and then demodulating and decoding the second burst using the second DDN.

According to the at least one example set forth above, the method further comprises: determining a first plurality of traffic packets for the first burst; routing the first plurality to a first DDN of the plurality of DDNs; reconstructing the first burst from the first plurality; and then demodulating and decoding the first burst using the first DDN.

According to the at least one example set forth above, the method further comprises: determining a first plurality of traffic packets for the first burst; and routing all of the first plurality of traffic packets for the first burst to a same DDN of the plurality of DDNs.

According to the at least one example set forth above, the method further comprises: receiving a load status report from each of the plurality of DDNs that indicates its respective capacity.

According to the at least one example set forth above, the method further comprises: updating a routing schedule based on the load status report, wherein the routing schedule is used to determine which of the plurality of DDNs will demodulate and decode a next burst.

Any of the method examples set forth above may be combined with one another according to any suitable combination.

According to at least one example, a computer is disclosed that is programmed to execute any combination of the method examples set forth above.

According to at least one example, a computer program product is disclosed that includes a computer readable medium storing executable instructions, wherein the instructions include any combination of the instruction examples set forth above.

According to the at least one example, a computer program product is disclosed that includes a computer readable medium that stores executable instructions, wherein the instructions include any combination of the method examples set forth above.

With reference to the figures, wherein like numerals indicate like parts throughout the several views, a satellite communication system 10 is described, wherein the system 10 comprises one or more base stations 12 (one is shown) and a constellation of satellites 14. More particularly, operational efficiency of the base station 12 may be improved with respect to receiving one or more inroutes from each of a plurality of user terminals 16—via the satellites 14 and according to a time-division multiple access (TDMA) scheme. As will be described more below, this can be achieved by balancing demodulation and decoding of data between a plurality of demodulator/decoder nodes (DDNs). In contrast, conventional base stations—operating in accordance with a TDMA scheme—designate which DDN will perform demodulation and decoding based upon which the inroute the data was received (e.g., all data received via inroute1 is directed to a first DDN, all data received via inroute2 is directed to a second DDN, etc.). However, in conventional systems, this may result in some demodulation and decoding nodes being under-utilized while other such nodes are over-utilized. This results in a demodulation and decoding inefficiency and may create a bottleneck (e.g., a point of traffic congestion). The presently-described system balances inroute traffic demodulation and decoding by basing, in part, which DDN performs demodulation and decoding upon which demodulator/decoder nodes have the greatest capacity to do so (e.g., at the time). Novel process(es) for using the base station 12 will be described following an illustrative descriptive of the system 10.

Base station 12 comprises a base station transmitter 18 for sending satellite uplinks and a base station receiver 20 for receiving satellite downlinks—each of which may be coupled to one or more antennas 22 (only one is shown). Transmitter 18 may be any suitable computing hardware configured to receive data, modulate and code the data into an outroute, and transmit the outroute via a satellite uplink to one or more of the satellites 14—e.g., wherein the intended recipient may be one or more of the user terminals 16. And antenna(s) 22 may be any suitable rod, wire, dish, or other instrument for transmitting outroutes and/or receiving inroutes over satellite radio frequencies.

Receiver 20 may comprise one or more computing devices (hardware) configured to receive inroutes over a relatively wide band, to perform radio frequency (RF) front-end processing, extract and/or form traffic packets from the respective inroutes, and to determine how to most efficiently demodulate and decode the traffic packets. In the illustrated examples, one processor 30 and one or more memory devices 32 (referred to herein simply as memory 32) are shown; however, it should be appreciated that many processors 30 and any size or arrangement of memory 32 may be used (e.g., separate memory devices of receiver 20 being designated as 32', 32", 32''', etc.). According to at least one example, receiver 20 may comprise a channelizer 34, a packet router 36, a plurality of demodulator/decoder nodes (DDNs) 38, 40, 42, . . . , 44, and a load balancer 46. Each of channelizer 34, router 36, DDNs 38-44, and load balancer 46 may comprise instructions embodied on memory 32 and/or executable by processor(s) 30. Alternatively, any one or more of channelizer 34, router 36, DDNs 38-44, and load balancer 46 may be hardware and/or may comprise its own (e.g., dedicated) processor(s) and/or (e.g., dedicated) memory. E.g., in at least one example, one or more of the channelizer 34, router 36, DDNs 38-44, or load balancer 46 comprise a field programmable gate array (FPGA) that is programmed (a.k.a., coded) with special instructions to perform at least some of the instructionblocks, functions, and/or processes described herein. Thus, while FIG. 1 may illustrate a single processor 30 and memory 32, receiver 20 may comprise any suitable number of processors 30 and/or any suitable amount of memory 32.

In general—and as will be explained more below—channelizer 34 receives inroutes, from satellites 14, via antenna 22 and extracts and/or forms traffic packets therefrom, the router 36 routes the traffic packets to various DDNs (according to their current capacity), the respective DDNs buffer in their respective memory the traffic packets until the last traffic packet arrives, then the respective DDNs 38-42 re-form bursts from the traffic packets and then demodulate and decode the bursts—all the while iteratively providing load status reports the load balancer 46, and the load balancer 46 parses these reports and updates a routing schedule in router 36, based on the reports, to improve operational efficiency of the receiver 20.

According to one example, processor 30 comprises one or more field programmable gate arrays (FPGAs) (e.g., an FPGA is an integrated circuit which may be reprogrammed after being deployed). In this example, the FPGA(s) may be programmed (a.k.a., coded) with instructions associated with predetermined functionality(ies) of the receiver 20 and/or the receiver's sub-components. Non-limiting examples of programming instructions include those implemented using VHSIC (Very High Speed Integrated Circuit) Hardware Description Language (VHDL), Verilog, or the like. Other examples of processor 30 include an electronic circuit comprising one or more discrete components and/or any device capable of processing electronic instructions such as a microprocessor, a microcontroller or controller, an application specific integrated circuit (ASIC), etc.—just to name a few. As will be apparent from the description that follows, processor 30 may be programmed to carry out at least a portion of the process described herein. For example, among other things, processor 30 can be programmed to execute digitally-stored instructions—e.g., which enable the receiver 20 to more efficiently execute demodulation and decoding. Non-limiting examples of these instructions will be described in greater detail below.

Memory 32 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, compact disc read-only memory (CD-ROM), a digital video disc (DVD), any other optical medium, paper tape, any other physical media with patterns of holes, random-access memory (RAM), programmable read-only memory (PROM), erasable programmable read-only memory (EPROM), electrically erasable programmable read-only memory (EEPROM), any other flash memory, any other memory chip or cartridge, or any other medium from which a computer can read. As discussed below, memory 32 may store and/or buffer data. In other examples, memory 32 may store one or more computer program products which may be embodied as software, firmware, or the like.

Turning now to the channelizer (see FIGS. 1-2), channelizer 34 may comprise an RF front end 48, an analog-to-digital converter (ADC) 50, and a plurality of channelizer units (CUs) 52, 54, 56. Each will be described below. In general, the channelizer 34 may receive inroutes over a relatively wide bandwidth, identify which channels (e.g., frequencies) are being used, and following filtering, frequency-conversion, down-sampling, and the like, extract and/or form traffic packets from the inroutes. As used herein, an inroute refers to a satellite communication transmission using one or more satellite carrier frequencies. In at least one example, channelizer 34 is configured to receive 256 inroutes over a 1.5 GigaHertz (GHz) spectrum; however, this is merely an example. Further, in at least one example, each inroute may have a symbol rate between 256 kilo-symbols/second (256 ksps) and 24 Mega (M)-symbols/second (24 Msps).

Channelizer 34 may be configured to communicate via a time-division multiple access (TDMA) scheme. As used herein, a TDMA scheme means that carrier frequencies received by the channelizer 34 are time-division multiplexed with a plurality of bursts, wherein each burst is received within a predetermined time slot (defined by a time slot beginning time and time slot ending time). For example, a duration of a time slot may vary (according to one non-limiting example, 2.5 milliseconds (ms) to 30 ms (e.g., for a 256 ksps symbol rate); according to another non-limiting example, 23 microseconds (μs) to 300 μs (e.g., for a 24 Msps symbol rate)). As used herein, a TDMA schedule refers to—for each carrier frequency—a plurality of time slots assigned for receiving bursts from a plurality of user terminals 16. As used herein, a burst refers to a predetermined amount of data sent and received (e.g., by receiver 20) within a predetermined time slot, wherein the predetermined amount of data comprises a burst payload that comprises one or more traffic packet payloads (e.g., typically a plurality of traffic packet payloads arranged in series). As used herein, a traffic packet is packet data that comprises a traffic packet header and a traffic packet payload, wherein the traffic packet payload is typically a portion of a message or data attempting to be communicated. Typically, the traffic packet payloads of multiple traffic packets need to be re-assembled in order to reconstruct the original message/data (e.g., sent from the user terminal 16).

Thus, it should be appreciated that the TDMA schedule is dynamic and the time slots, the time slot (or burst) durations, the channels utilized, etc. may be changed and/or updated repeatedly. For example, user terminals 16, which also operate in accordance with the same TDMA scheme, may transmit bursts intermittently according to the TDMA schedule and in this manner, interference (e.g., concurrent transmissions over a single channel at the same time) may be minimized or avoided.

Figure 2:
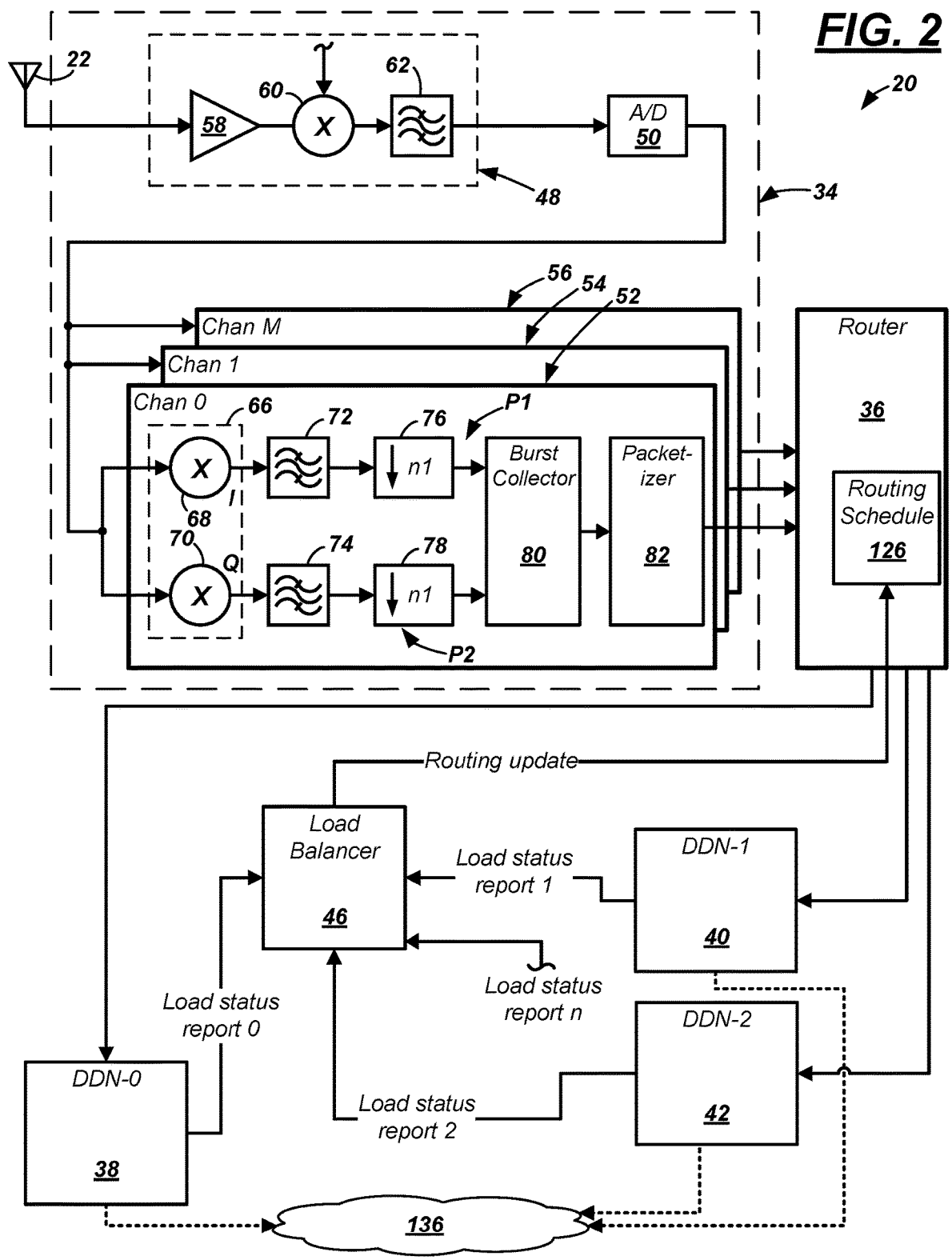
FIG. 2 illustrates an example of a base station receiver.

As shown in FIG. 2, RF front end 48 may comprise an amplifier 58, a mixer 60, and one or more filters 62. For example, amplifier 58 may amplify the received RF signal. Mixer 60 may provide an analog output signal by heterodyning the amplified RF signal with the signal from a local oscillator (not shown)—e.g., shifting RF signal to a different frequency range. And filter(s) 62 may remove unwanted noise from the analog output signal. Thereafter, the analog output signal may be provided to the ADC 50.

ADC 50 may be a hardware component that receives the analog output signal from the RF front end 48 and digitizes it via sampling. According to one non-limiting example, ADC 50 outputs a continuous stream of samples at a predetermined rate—referred to as a composite digital output signal (according to one non-limiting example, at 300 Mega-samples/second; according to another non-limiting example, at 1.5 Giga-samples/second). This composite digital output signal then may be provided to the channelizer units (CUs) 52-56, wherein each unit processes a respective portion of the output signal (e.g., according to its frequency).

Each channelizer unit (CU) 52-56 may comprise an IQ mixer 66 (e.g., having mixers 68, 70), a pair of filters 72, 74, a pair of down-samplers 76, 78, a burst collector 80, and a packetizer 82. In at least one example, each CU 52, 54, 56 may be identical; therefore, only one (CU 52) will be explained here in detail. Further, it should be appreciated that while only three CUs are illustrated, many more may exist (e.g., a quantity M). For example, continuing with the example above (wherein receiver 20 is configured to operate over 256 carrier frequencies), in this example, channelizer 34 would comprise 256 CUs—one for each carrier frequency (e.g., M=256). Thus, continuing with the example, CU 52 receives data associated with a respective carrier frequency (from among the 256 carrier frequencies).

IQ mixer 66 of CU 52 may comprise an I-mixer and a Q-mixer which splits the digital signal into a first path P1 and a second path P2, wherein the "I" pertains to an amplitude of an in-phase digital signal and the "Q" pertains to an amplitude of a quadrature-phase, as will be appreciated by those skilled in the art. Filters 72, 74—located along each respective path P1, P2—may be any suitable filters adapted to remove additional noise from the signals. And down-samplers 76, 78—following each filter 72, 74 along the respective paths P1, P2—may decimate the signal as desired (e.g., a down-sampling factor may be determined by a ratio of an ADC sampling rate and a DDN desired put sampling rate). According to one example, if the channel symbol rate is 10 M-samples/second and the ADC digital output signal is 300 M-samples/second, then according to the Nyquist theorem, down-samplers 76, 78 may decimate the digital signal received from the filter 72, 74 by a factor of 15—e.g., to 20 M-samples/second. The outputs of the down-samplers 76, 78 are next provided to the burst collector 80.

Burst collector 80 may receive extract—from its respective carrier frequency—a burst sample set in accordance with a scheduled time slot. Each burst sample set may comprise one or more bursts. These burst sample sets are then sent to the packetizer 82.

Packetizer 82 may extract and/or form—from each burst sample set—one or more traffic packets. More particularly, packetizer 82 may extract a plurality of portions of a burst payload and assign each a unique traffic packet header (wherein the traffic packet header may aid in re-forming a burst later), as discussed more below. Burst collector 80 and/or packetizer 82 may be implemented in hardware, software, or a combination thereof.

Figure 3:
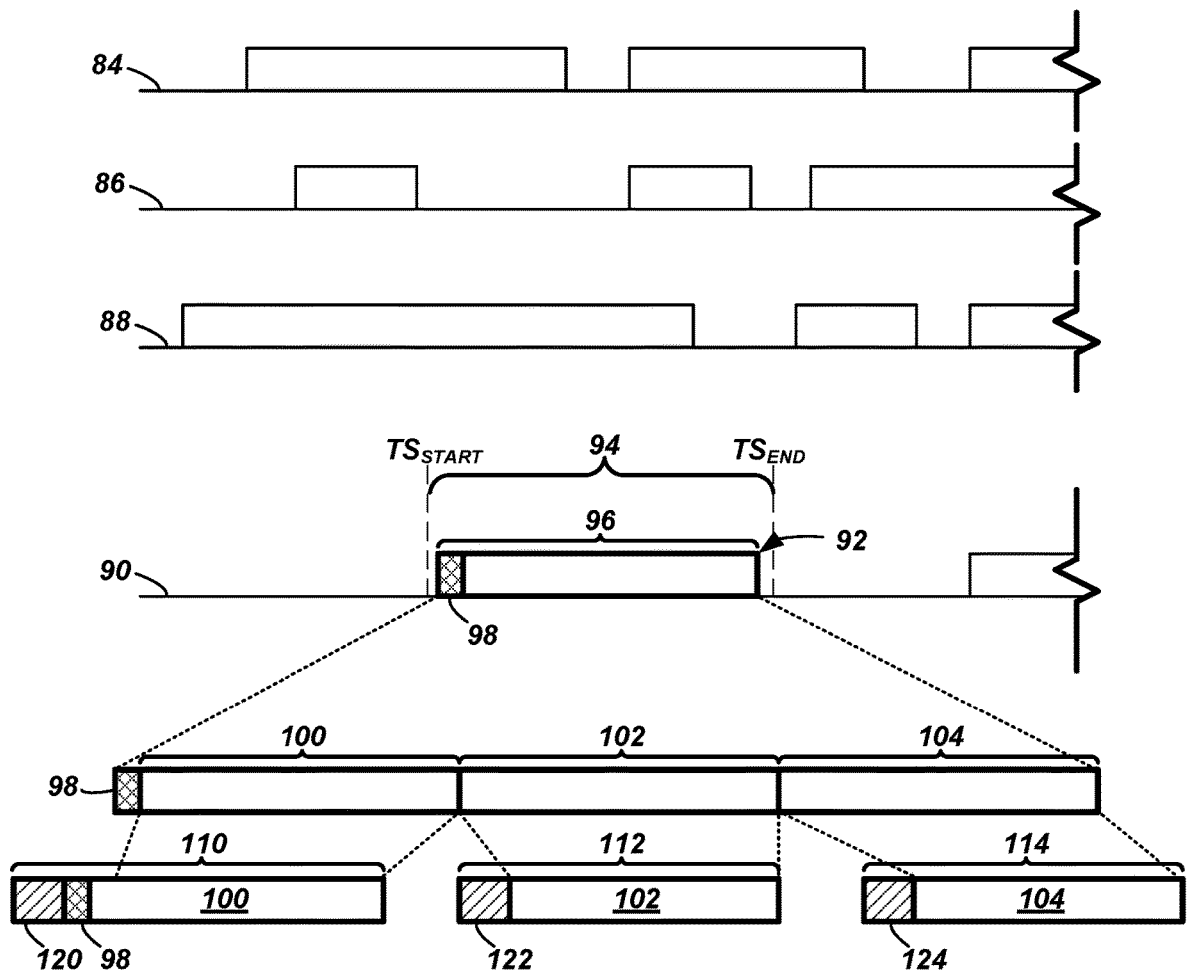
FIG. 3 is a schematic diagram illustrating several example carrier frequencies.

FIG. 3 provides an illustrative example of a portion of the functions of burst collector 80 and packetizer 82. In FIG. 3, four carrier frequencies 84, 86, 88, and 90 are illustrated, and carrier frequency 90 is illustrated in greater detail (by way of example).

FIG. 3 illustrates that the carrier frequency 90 may comprise a burst sample set 92 in an exemplary time slot 94 which may be read by the burst collector 80. Time slot 94 may extend from a time slot beginning time ($TS_{START}$) to a time slot ending time ($TS_{END}$), and the time slot 94 may be part of the TDMA schedule (referred to above). In this example, the burst sample set 92 may comprise a single burst 96; however, in other examples burst sample set 92 may comprise more than one burst within the time slot 94.

As described above, burst collector 80 may extract the burst (from the burst sample set 92); this may include determining the beginning and end of the burst 96. In one example, this includes burst collector 80 determining a burst header 98 based on burst 96; more particularly, the burst collector 80 (or other aspect of channelizer 34) may attach a unique burst header to each burst. The burst header 98 may include information regarding the quantity and characteristics of data within the burst 96 (e.g., burst length, burst start time, symbol rate, etc.). In some examples, each burst 96 further may comprise a burst footer (not shown). In some examples, an end of burst 96 is determined based on an ending time ($TS_{END}$) of the time slot 94 (per the TDMA scheme).

Once the burst 96 is identified by burst collector 80, packetizer 82 may extract and/or form one or more traffic packet payloads therefrom. In this example, burst 96 may be considered to comprise three traffic packet payloads 100, 102, 104. This is merely an example; in other examples, the burst 96 may have more or fewer traffic packet payloads than three. In extracting the traffic packet payloads 100-104, the packetizer 82 may define three traffic packets 110, 112, 114 respectively comprising the traffic packet payloads 100, 102, 104 and corresponding traffic packet headers 120, 122, 124 (e.g., optionally assigning '0' (zero) padding at an end of the last packet (e.g., 124), as equal-sized packets may simplify buffering at the DDN). Further, a first traffic packet of the burst 96 (e.g., traffic packet 110) additionally may be assigned the burst header 98 (e.g., shown sandwiched between the traffic packet header 120 and the traffic packet payload 100). This is merely one example; other packetizing techniques could be used instead.

Above, channelizer 34 was described as comprising a processor and memory in some examples. In still further examples, one or more of the RF front end 48, ADC 50, or any of the CUs 52, 54, 56 could have one or more dedicated processors and/or memory as well.

Returning to FIG. 2, packet router 36 may receive the output of the CUs 52-56 (of channelizer 34) and determine to which DDN 38, 40, 42 (or other DDN not shown) the traffic packets 110, 112, and 114 should be transmitted for demodulation and decoding.

Router 36 may make this determination using a routing schedule 126 stored in any suitable memory (e.g. such as memory 32) which defines a set of criteria for determining whither a traffic packet should be routed—i.e., to which DDN (e.g., DDN 38, 40, 42, . . . , 44). According to one example, a predetermined criteria may be: send all traffic packets extracted from a same burst to the same DDN. Thus, continuing with the example above, all packets 110, 112, and 114 would be sent to the same DDN (e.g., one of 38, 40, 42, etc.). Similarly, if burst 96 were a second portion of a message—and the traffic packets of a previously-received burst were already routed to, e.g., DDN 38, then traffic packets 110-114 also could be routed to DDN 38.

Figure 4:
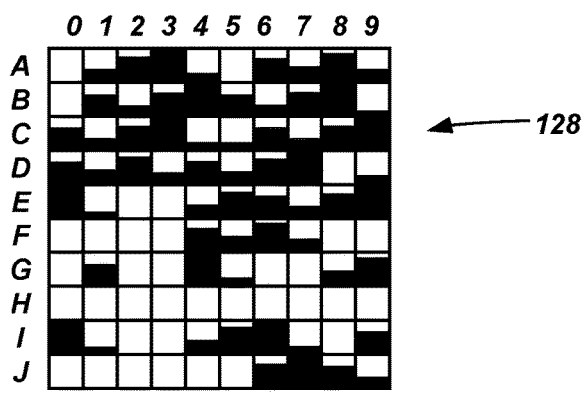
FIG. 4 is a schematic diagram graphically depicting a capacity array.

According to another example predetermined criteria, routing schedule 126 may comprise a current capacity map 128 of DDN capacities (e.g., an array as shown in FIG. 4), wherein router 36 evaluates the capacity map 128 and routes the packets (e.g., 110-114) to a DDN determined by the router 36 to have an adequate or a greatest capacity. As used herein, having capacity refers having to an ability or power to demodulate and decode without delay or with less delay (e.g., less buffering than other DDNs). Thus, DDNs which are buffering large amounts of packets may be busiest and have minimal capacity. In contrast, DDNs which are currently not buffering or processing any traffic packets may have the greatest capacity. As explained more below, the capacity map 128 may be updated by the load balancer 46.

The capacity map 128 may provide router 36 information regarding instantaneous capacities of dozens, hundreds, etc. DDNs. For purposes of illustration only (and not to be limiting), the rows of capacity map 128 in FIG. 4 are labeled A, B, C, . . . , J and the columns are labeled 0, 1, 2, . . . , 9, wherein the intersection of a row and column define a cell. Each cell may have a value that corresponds to the capacity of the respective DDN. For example, DDN 38 may correspond with (A,0), DDN 40 may correspond with (A,1), DDN 42 may correspond with (A, 2), . . . and DDN-n may correspond with (J, 9).

Accordingly, FIG. 4 provides a visual example of capacity map 128 (although a visual example is not required). According to one example, high capacity at a DDN is represented as an all-white cell, no capacity or minimal capacity at a DDN is represented as an all-black cell, and a partial capacity (e.g., to some resolvable degree) is represented as a partially-white and partially-black cell. Thus, for example, according to one example, router 36 could elect to route traffic packets 110-114 to DDN 38 at (A,0).

Figure 5:
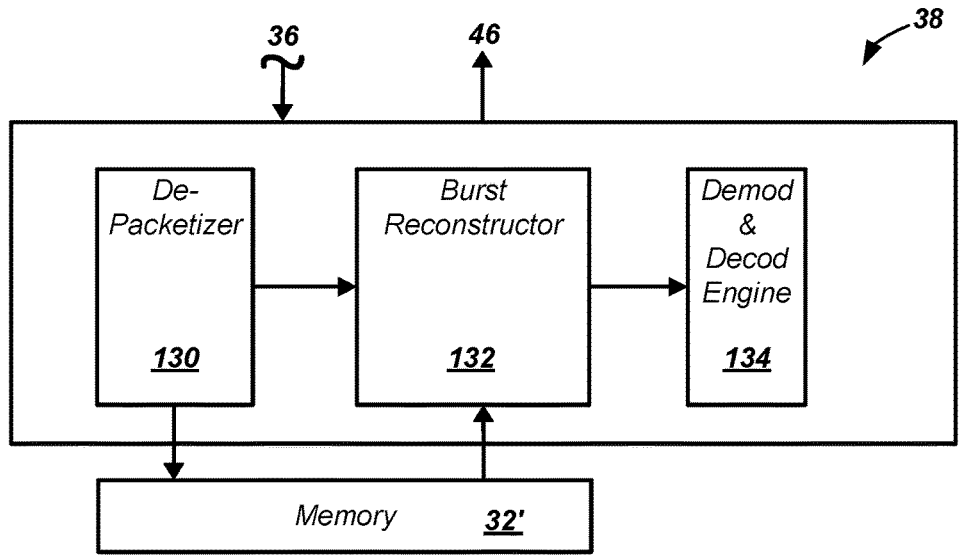
FIG. 5 is a schematic diagram illustrating an example of a demodulator/decoder node.

FIGS. 2 and 5 illustrate an example of DDN 38 which may comprise a de-packetizer 130, a burst reconstructor 132, and a demodulator/decoder engine (DDE) 134. De-packetizer 130 may strip a traffic packet header from a traffic packet (after the packets are read out from respective memory) and buffer a corresponding traffic packet payload into memory (e.g., along with the burst header). Continuing with the example above, de-packetizer 130 may strip headers 120, 122, 124 from traffic packets 110, 112, 114, respectively, and store traffic packet payloads 100, 102, 104 (and burst header 98) in memory 32—i.e., until all the traffic packet payloads of a corresponding burst (e.g., burst 96) are received at DDN 38.

Once all traffic packet payloads are received, the payloads and burst header may be sent to the burst reconstructor 132 (e.g., burst reconstructor 132 may receive payloads 100, 102, 104 and burst header 98). The burst reconstructor 132, as its name suggests, may re-assemble or reconstruct the burst 96 (as originally received). In this manner, the burst 96—having been routed to a DDN which can efficiently process its contents—may be ready for demodulation and decoding.

Next, DDE 134 may receive the reconstructed burst from the burst reconstructor 132 and perform demodulation and decoding. Demodulation and decoding techniques are known to skilled artisans and will not be described here in detail.

Following the DDE 134, the data or message which results from the demodulation and decoding may be sent to any suitable recipient. In one example, this data or message is sent to a third-party recipient via a 3GPP core network 136 (see FIG. 2) (the architecture and elements of core network 136 will not be described herein as such are known in the art).

As will be described more below and as best shown in FIG. 2, the DDN 38 may transmit a load status report to the load balancer 46. Load status reports may be electronically-communicated messages which indicate how much capacity the respective DDN has. For example, if the respective DDN has an empty memory buffer, a full memory buffer, or some degree therebetween, then it may convey this information to the load balancer 46 via the load status report. As will be explained in the process below, the load balancer 46 may update the routing schedule 126 of router 36 using such load status reports.

Figure 6:
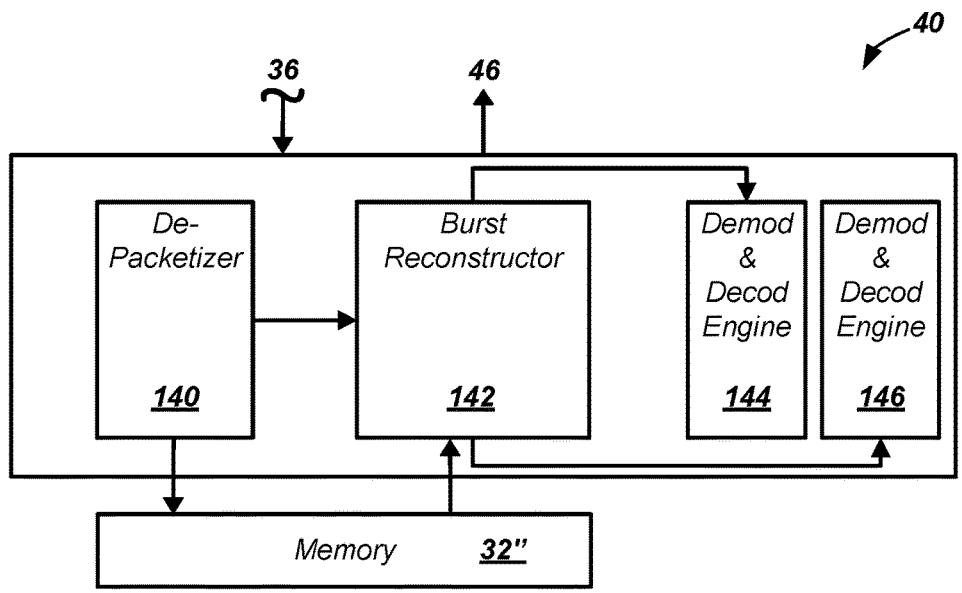
FIG. 6 is a schematic diagram illustrating another example of a demodulator/decoder node.

Turning now to DDN 40 shown in FIGS. 2 and 6, the exemplary DDN may comprise a de-packetizer 140, a burst reconstructor 142, a first demodulator/decoder engine (DDE) 144, and a second DDE 146. In at least one example, the de-packetizer 140, the burst reconstructor 142, and the DDE 144 may be identical to the de-packetizer 130, the burst reconstructor 132, and the DDE 134 described above. Therefore, they will not be re-described here. Further, DDE 146 may be identical to DDE 134 as well. Consequently, the operational capacity of DDN 40 may be greater (in general) than the DDN 38—e.g., as DDN 40 comprises two concurrently-operating DDEs which enable it to demodulate and decode more expeditiously. Otherwise, DDN 40 may operate similarly as DDN 38—e.g., including sending load status reports to load balancer 46.

Figure 7:
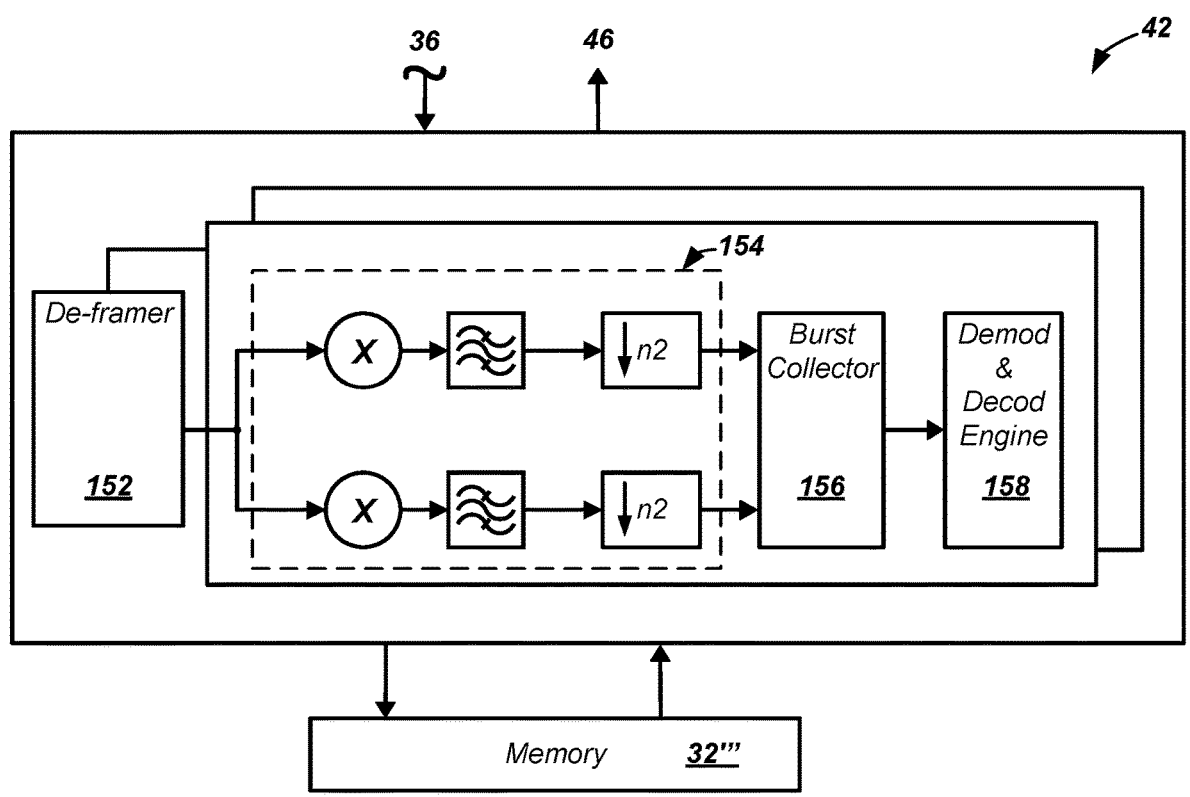
FIG. 7 is a schematic diagram illustrating yet another example of a demodulator/decoder node.
Figure 8:
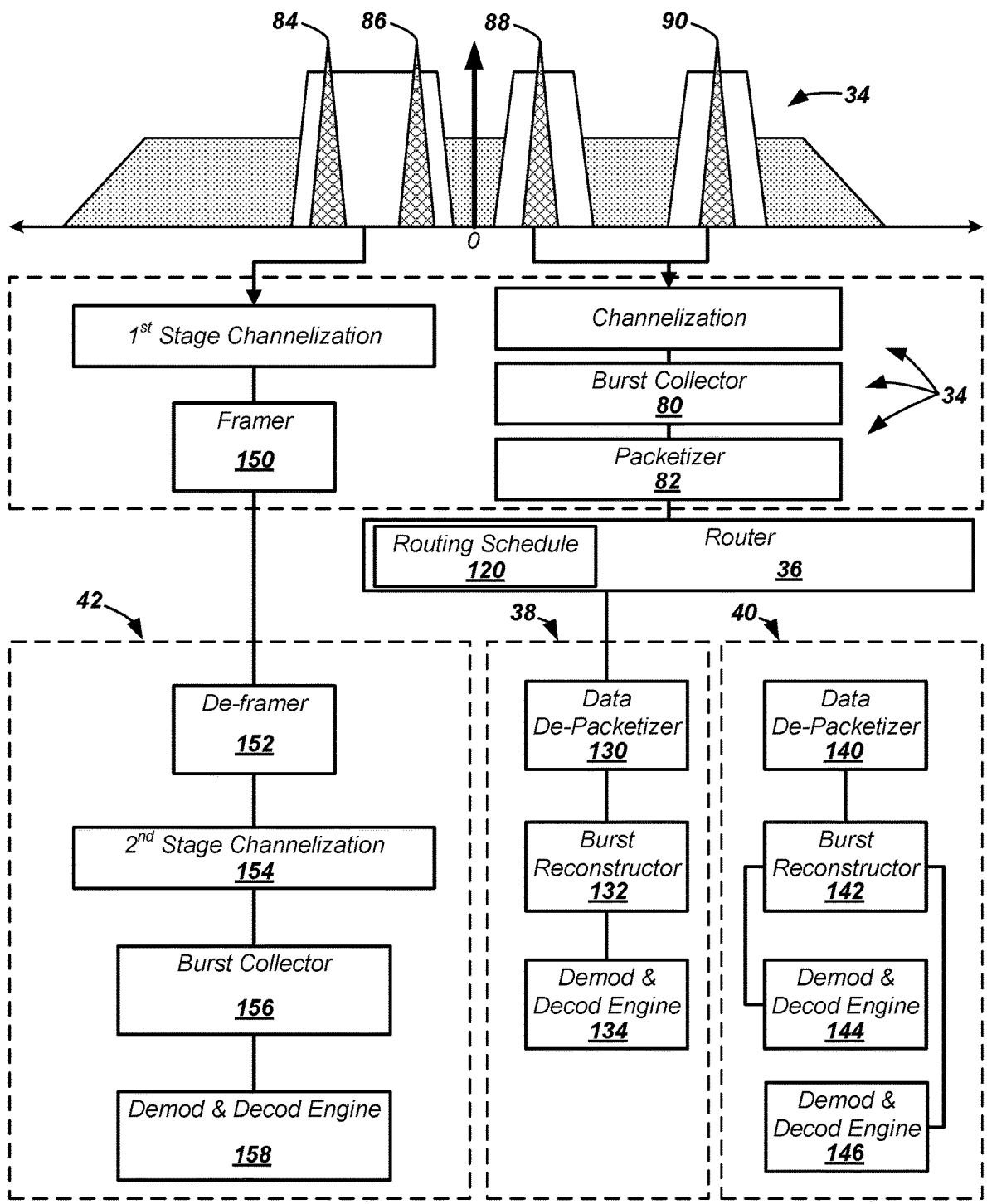
FIG. 8 is another diagram illustrating the base station receiver, including the demodulator/decoder nodes shown in FIGS. 5-7.

The above-described system 10 also may include some conventional components (150, 42) such as those shown in FIGS. 2 and 7-8. For example, FIGS. 7-8 illustrate that the channelizer 34 may comprise a framer 150, and a differently-arranged demodulator/decoder node (DDN) 42. Framer 150 may break down the continuous output of the IQ mixer 66, filters 72-74, and down-samplers 76-78 (of channelizer 34) into a pluralities of traffic packets which each collectively comprise a frame. These traffic packets may bypass the router 36 and proceed to a DDN (e.g., such as DDN 42)—e.g., as selected by processor 30. Framer 150 may be an electronic device (e.g., including a processor) or be implemented using software. Framer 150 may be used with two carrier frequencies (e.g., 84, 86), as shown in FIG. 8. It should be appreciated that while not shown, the receiver 20 may comprise mixers, filters, decimators, etc. may be arranged to deliver a signal to framer 150. Further, similar elements of channelizer 34 (which are exemplified in FIG. 2) (e.g., such as the mixers, filters, decimators, etc.) are not duplicated in FIG. 8 for purposes of brevity and not to be limiting.

DDN 42 may comprise a de-framer 152, a second-stage channelizer 154, a burst collector 156, and a demodulator/decoder engine (DDE) 158. The de-framer 152 may reverse the operation of the framer 150—e.g., re-assembling the traffic packets into frames. The second-stage channelizer 154 may operate similarly to the IQ mixer 66, filters 72-74, and down-samplers 76-78 (described above). However, the frame passed through the second-stage channelizer 154 may be a sub-band carried by an intermediate frequency (e.g., requiring additional frequency down-converting). Thereafter, burst collector 156 and DDE 158 perform functions similar to burst collector 80 and DDE 134.

Returning again to FIG. 1, load balancer 46 comprises a set of instructions to receive load status reports from the DDNs (e.g., 38, 40, 42, . . . , 44), parse these reports to determine a current capacity of the respective DDNs, and then based on the reports, updating the routing schedule 126 in router 36.

The satellites 14 shown in FIG. 1 may be any suitable satellite communication equipment located in earth's orbit—non-limiting examples include: observation satellites, communications satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans. Satellite(s) 14 may communicate with the UTs 16 via a so-called service link via any suitable frequency.

User terminals (UTs) 16 may be any suitable end-user equipment capable of satellite communication. For example, while not illustrated, the terminals each may have a satellite chipset enabling wireless communication in a satellite beam (e.g., transmitted from one of the satellites). Non-limiting examples of satellite terminals include a satellite telephone, a portable computer, a mobile satellite receiver (e.g., for receiving infotainment and/or entertainment services in a vehicle) such as a land vehicle (e.g., automobile, truck, military vehicle, etc.), a marine vehicle, an aircraft, and the like.

Figure 9:
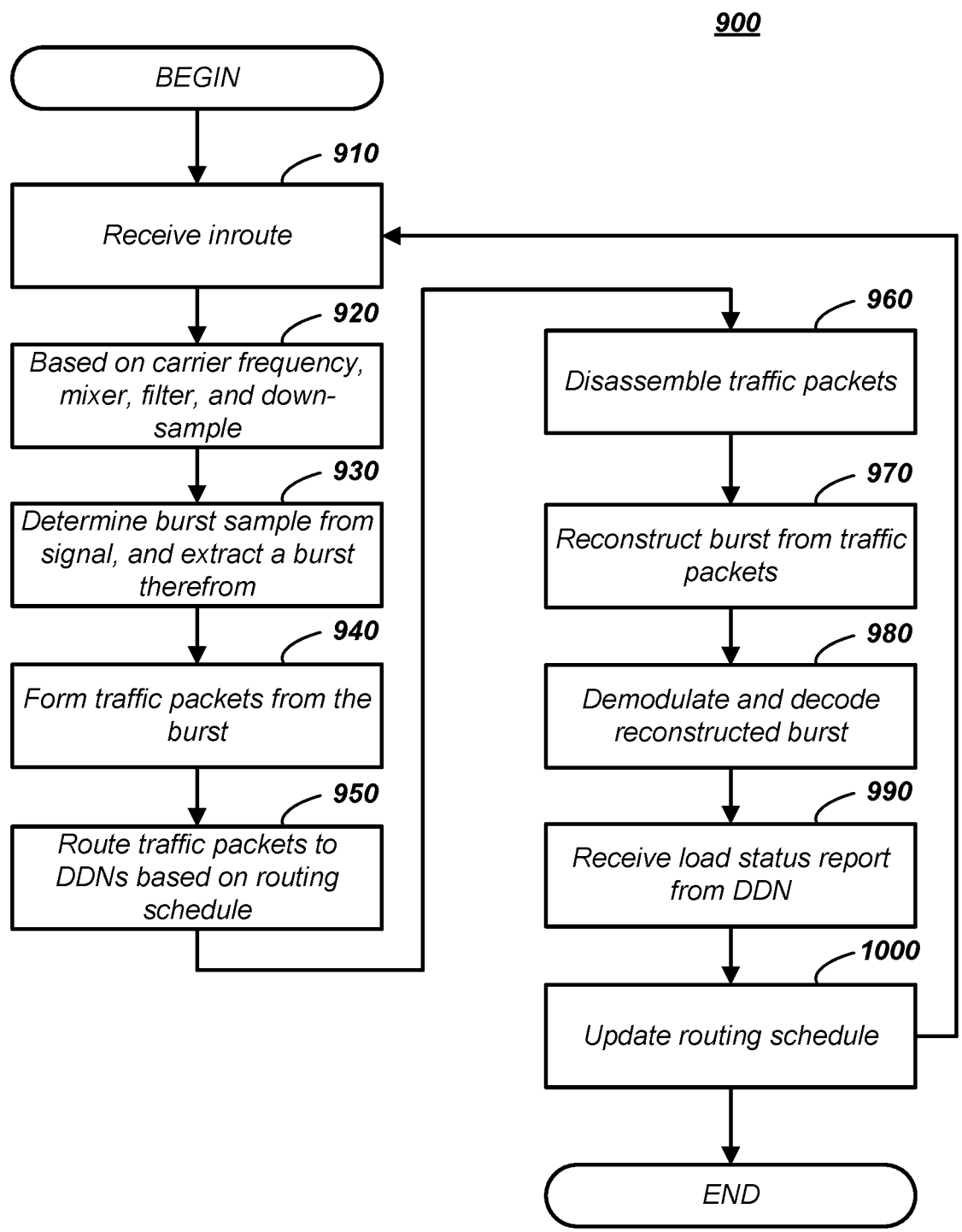
FIG. 9 is a flowchart illustrating an example process of load balancing bursts received at the base station receiver.

Turning now to FIG. 9, a process 900 is illustrated for operating the receiver 20, wherein demodulation and decoding is balanced among DDNs (e.g., 38, 40, 42, . . . , 44). The process may begin with block 910 wherein the receiver 20 (e.g., the antenna 22 and channelizer 34) receives an inroute. Block 910 may include, using the RF front end 48, amplifying, mixing, and filtering the inroute. Further block 910 may include digitizing the signal via ADC 50 and providing the output to one of a plurality of channelizer units (CUs) 52, 54, 56.

According to one example of block 920 (which follows), CU 52 may pass the digitized unit through IQ mixer 66, filters 72-74, and through down-samplers 76-78 (thereby decimating the signal to a suitable rate).

Following block 920 (in block 930), burst collector 80 may extract a burst sample set from the signal which comprises one or more bursts. Each burst may comprise a burst header and a burst payload.

In block 940 which follows, the packetizer 82 may form from each burst a plurality of traffic packets. More particularly, the packetizer 82 may break a burst down into traffic packet payloads, assign each payload a traffic packet header, and locate the burst header in one of the traffic packets. Thereafter, the traffic packets may be ready to leave the channelizer 34 and be routed to a DDN.

In block 950, router 36 may review the routing schedule 126 and determine which DDNs have the greatest capacity and then route those traffic packets to that determined DDN. As discussed above, other factors may determine which DDN the router 36 routes the traffic packets. For example, if other traffic packets were transmitted as part of a common message (e.g., a collection of associated bursts), then the same DDN may demodulate and decode all associated traffic packets. According to another example, if the burst header indicated a priority, it may be sent to a DDN with greater capacity or faster computational capability (e.g., DDN 40 having two DDEs 144, 146). Still other examples exist.

It should be appreciated that the routing traffic packets (or bursts) is not dependent upon the carrier signal upon which they were received (i.e., according to this design, all traffic packets derived from a carrier signal need not be routed only to a particular DDN). For instance, a common (i.e., same) DDN (e.g., DDN 38) may demodulate and decode traffic packets from both carrier signals 88 and 90. DDN 40 may do similarly—if the router so designates. Flexibility in routing traffic packets facilitates load balancing and increases the overall performance of the receiver 20.

In block 960 which follows, the traffic packets—now at a determined DDN—may be disassembled. For example, using traffic packet header information, the de-packetizer 130 may group traffic packets together and then strip the headers therefrom. Further, de-packetizer 130 may buffer traffic packets in memory 32 until all traffic packets from a given burst are buffered there.

In block 970, burst reconstructor 132 may determine that all traffic packets have arrived and reconstruct the original burst. This may include reassembling the traffic packets into the format of the original burst, including locating the burst header therewith. The burst is now ready for demodulation and decoding.

In block 980 which follows, the burst may be passed through the DDE 134. Therein, the DDE 134 may perform demodulation and decoding according to techniques known in the art.

Following (or any time during) block 980, block 990 may include the DDN 38 transmitting a load status report to the load balancer 46. The load balancer 46 may sort which DDNs have greatest capacity. In at least one example, the load balancer 46 comprises an instruction that orders or prioritizes which DDNs have the greatest capacity.

In block 1000, the load balancer 46 may transmit this instruction to the router 36 which may update its routing schedule 126 accordingly. In this manner, while new inroutes and new bursts are received, the routing schedule 126 is repeatedly updated to enhance efficiency.

Following block 1000, the process 900 may loop back to block 910 and repeat, or simply end.

Other examples also exist. For example, processor 30 may determine whether an inroute should be directed to the burst collector 80 and packetizer 82 of channelizer 34 or whether it should be directed to the framer 150 of channelizer 34. As discussed above, in the latter instance, frames may be transmitted to the DDN 42 and a like process may be carried out, these frames also requiring down-conversion using the second-stage channelizer 154.

Thus, there has been described a satellite communication system that operates according to a TDMA scheme and that includes a router for optimizing which demodulator/decoder nodes perform the demodulation and decoding. In at least one example, the demodulator/decoder nodes send reports regarding their capacity so that the router may continue to optimize demodulation and decoding.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A base station receiver, comprising:
a processor and memory storing instructions executable by the processor such that the processor is programmed to:
    receive, via a time-division multiple access (TDMA) scheme, a first carrier frequency comprising a first burst, wherein the first burst comprises a first plurality of traffic packets;
    route the first plurality of traffic packets to a first demodulating and decoding node of a plurality of demodulating and decoding nodes;
    update a routing schedule based on the routing of the first plurality of traffic packets to a first demodulating and decoding node;
    receive, via the TDMA scheme, a second carrier frequency comprising a second burst, wherein the second burst comprises a second plurality of traffic packets; and
    route the second plurality of traffic packets to a second demodulating and decoding node of the plurality of demodulating and decoding nodes based on the routing schedule,
    wherein the first plurality of traffic packets are demodulated and decoded at the first demodulating and decoding node and the second plurality of traffic packets are demodulated and decoded at the second demodulating and decoding node.

2. The base station receiver of claim 1, wherein the processor is further programmed to:
    determine the first plurality of traffic packets for the first burst;
    reconstruct the first burst from the first plurality; and then
    demodulate and decode the first burst using the first demodulating and decoding node.

3. The base station receiver of claim 2, wherein the processor is further programmed to:
    determine the second plurality of traffic packets for the second burst;
    reconstruct the second burst from the second plurality; and then
    demodulate and decode the second burst using the second demodulating and decoding node.

4. The base station receiver of claim 1, wherein the processor is further programmed to:
    determine the first plurality of traffic packets for the first burst; and
    route all of the first plurality of traffic packets for the first burst to the first demodulating and decoding node.

5. The base station receiver of claim 1, wherein the processor is further programmed to:
    receive a load status report from the first demodulating and decoding note that indicates a capacity.

6. The base station receiver of claim 5, wherein the processor is further programmed to:
    update the routing schedule based on the load status report.

7. The base station receiver of claim 6, wherein the routing schedule is based upon a load status report from each of the plurality of demodulating and decoding nodes of the base station receiver.

8. The base station receiver of claim 1, wherein updating the routing schedule further comprises updating a capacity map corresponding to the first demodulating and decoding node based on the routing of the first plurality of traffic packets, wherein the capacity map represents a capacity to demodulate and decode traffic packets among the plurality of demodulating and decoding nodes.

9. A base station receiver, comprising:
a processor comprising instructions to cause the processor to:

receive, via a time-division multiple access (TDMA) scheme, a carrier frequency comprising a first burst and a second burst, wherein the first burst comprises a first plurality of traffic packets and the second burst comprises a second plurality of traffic packets;

determine from among a plurality of demodulating and decoding nodes (DDNs) which of the plurality will demodulate and decode the first burst and which of the plurality will demodulate and decode the second burst, wherein the determination includes determining a capacity of at least some of the plurality;

route the first plurality of traffic packets to a first DDN of the plurality of DDNs;

route the second plurality of traffic packets to a second DDN of the plurality of DDNs; and then, demodulate and decode both the first and second bursts.

10. The base station receiver of claim 9, the instructions further comprising, to:

determine a first plurality of traffic packets for the first burst;

reconstruct the first burst from the first plurality; and then demodulate and decode the first burst using the first DDN.

11. The base station receiver of claim 10, the instructions further comprising, to:

determine a second plurality of traffic packets for the second burst;

reconstruct the second burst from the second plurality; and then demodulate and decode the second burst using the second DDN.

12. The base station receiver of claim 9, the instructions further comprising, to:

receive a load status report from each of the plurality of DDNs that indicates its respective capacity.

13. The base station receiver of claim 12, the instructions further comprising, to:

update a routing schedule based on the load status report, wherein the routing schedule is used to determine which of the plurality of DDNs will demodulate and decode a next burst.

14. The base station receiver of claim 13, wherein the routing schedule is based upon a load status report from each of a plurality of DDNs of the base station receiver.

15. A method of operating a base station, comprising:

receiving, via a time-division multiple access (TDMA) scheme, a carrier frequency comprising a first burst and a second burst, wherein the first burst comprises a first plurality of traffic packets;

determining from among a plurality of demodulating and decoding nodes (DDNs) which of the plurality will demodulate and decode the first burst and which of the plurality will demodulate and decode the second burst, wherein the determination includes determining a capacity of at least some of the plurality;

routing the first plurality of traffic packets to a first DDN of the plurality of DDNs;

routing the second plurality of traffic packets to a second DDN of the plurality of DDNs; and then, demodulating and decoding both the first and second bursts.

16. The method of claim 15, further comprising:

determining a first plurality of traffic packets for the first burst;

reconstructing the first burst from the first plurality; and then demodulating and decoding the first burst using the first DDN.

17. The method of claim 16, further comprising:

determining a second plurality of traffic packets for the second burst;

reconstructing the second burst from the second plurality; and then demodulating and decoding the second burst using the second DDN.

18. The method of claim 15, further comprising:

receiving a load status report from each of the plurality of DDNs that indicates its respective capacity.

19. The method of claim 18, further comprising:

updating a routing schedule based on the load status report, wherein the routing schedule is used to determine which of the plurality of DDNs will demodulate and decode a next burst.

* * * * *